(12) United States Patent
Chang

(10) Patent No.: US 10,279,905 B2
(45) Date of Patent: May 7, 2019

(54) MULTIPURPOSE AIR VEHICLE

(71) Applicant: Tae-Jung Chang, Palisades Park, NJ (US)

(72) Inventor: Tae-Jung Chang, Palisades Park, NJ (US)

(*) Notice: Subject to any disclaimer, the term of this patent is extended or adjusted under 35 U.S.C. 154(b) by 0 days.

(21) Appl. No.: 15/575,806

(22) PCT Filed: Sep. 26, 2016

(86) PCT No.: PCT/KR2016/010730
§ 371 (c)(1),
(2) Date: Nov. 20, 2017

(87) PCT Pub. No.: WO2018/056484
PCT Pub. Date: Mar. 29, 2018

(65) Prior Publication Data
US 2018/0346113 A1 Dec. 6, 2018

(51) Int. Cl.
*B64C 39/02* (2006.01)
*B64C 29/00* (2006.01)
(Continued)

(52) U.S. Cl.
CPC .............. *B64C 39/02* (2013.01); *B64C 1/062* (2013.01); *B64C 27/08* (2013.01); *B64C 27/12* (2013.01);
(Continued)

(58) Field of Classification Search
CPC ....... B64C 1/062; B64C 35/006; B64C 39/00; B64C 39/02; B64C 29/00; B64C 29/0033; B64C 29/0091; B64C 27/08
See application file for complete search history.

(56) References Cited

U.S. PATENT DOCUMENTS 3,633,849 A * 1/1972 Kling .................... B64C 27/20
244/12.2
4,537,372 A * 8/1985 Forizs ................ B64C 29/0033
244/12.4
(Continued)

*Primary Examiner* — Philip J Bonzell
*Assistant Examiner* — Tye William Abell
(74) *Attorney, Agent, or Firm* — Michael E. Zall

(57) ABSTRACT

Disclosed is a multipurpose air vehicle including a frame (1) on which a propeller (11) and a mechanical unit (10) equipped with an engine are mounted, and a cabin (2) is coupled inside the frame (1). The frame (1) is constructed by upper and lower circular plates (101, 102) and curved posts (111, 112, 113, 114) that interconnect the upper and lower circular plates (101, 102), and is provided with two or more arms (12) that can protrude and retract, and a propeller (11) is provided on the tip end of each arm (12). The cabin (2) includes a circular plate member (3) and further includes at least four connectors (21) provided on the front, the rear, the left, and the right ends thereof, and each connector (21) has a tip end installed on a rail (13) of the frame (1) so as to guide pivoting of the cabin (2). The multipurpose air vehicle may freely perform upward and downward movement and forward and rearward movement, and thus may be used anywhere in the air, ground, or water. Moreover, the multipurpose air vehicle may allow the cabin (2) to maintain horizontal balance and to provide a lift force as needed, regardless of the flying angle during the upward or downward movement of the air vehicle.

8 Claims, 7 Drawing Sheets

(51) Int. Cl.
*B64C 35/00* (2006.01)
*B64C 1/06* (2006.01)
*B64C 27/52* (2006.01)
*B64C 27/08* (2006.01)
*B64C 27/12* (2006.01)

(52) U.S. Cl.
CPC .......... *B64C 27/52* (2013.01); *B64C 29/0033* (2013.01); *B64C 35/00* (2013.01)

(56) References Cited

U.S. PATENT DOCUMENTS

| | | | |
|---|---|---|---|
| 4,703,906 A * | 11/1987 | Eickmann | B64C 11/28 244/17.23 |
| 9,611,032 B2 * | 4/2017 | Briod | B64C 17/00 |
| 2011/0042510 A1 * | 2/2011 | Bevirt | B64C 29/0033 244/12.4 |

* cited by examiner

MULTIPURPOSE AIR VEHICLE

TECHNICAL FIELD

The present invention generally relates to manned air vehicles, and more particularly to manned air vehicles comprised of multiple vertical-ascent propellers (as frequently seen in drones) and one or more cabins in the body that can accommodate at least one person.

BACKGROUND ART

As human beings continue migrating to cities, and as commercial transport and the transport of human beings themselves are increasingly carried out on a finite number of roads, problems such as traffic congestion, pollution, and accidents become worse. Meanwhile, conventional forms of air transportation, such as airplanes, not only require runways and hangars, but also result in nearly 100% mortality when there is a crash. Consequently, air transportation is generally less accessible and regarded with more fear when compared to ground transportation.

OBJECTS AND SUMMARY OF THE INVENTION

To solve the aforementioned problems, an objective of the present invention is to provide air vehicle that satisfy the following requirements:
1. They are safer than ground transportation;
2. They do not require runways, thus enabling users to take off or land on their home property or other grounds of their choosing;
3. They have low fuel consumption;
4. They are affordable, thus available to anyone who can buy a car;
5. They do not require special training for operation.

An air vehicle known as a helicopter is generally comprised of a vehicle body, some propellers, and a power device that rotates the propellers in order to generate a lift force and a propulsive force. The propellers generally have two to five rotating blades and are installed on axles located at the front and the rear sides of the helicopter's body. Such a helicopter simultaneously uses a lift, force generated by the main propeller and a propulsive force acquired from the slope of the main propeller's rotation angle.

One drawback of a helicopter is that because its body generates no lift force, its main propeller must primarily generate the lift force. Consequently, the forward speed of a helicopter is slow. Another drawback of a helicopter is that because its main propeller generates both a lift force and, a propulsive force, the main propeller's blades have long lengths. Consequently, a helicopter requires not only a large helipad but also a large hangar. Furthermore, helicopters, in addition to other conventional air vehicles, have no safety devices that protect against heavy casualties in the event of a crash.

Technical Problem

An object of the present invention is to solve the aforementioned problems by with a novel air vehicle that can reduce the length of its propeller blades compared to known air vehicles, thereby enabling a reduction in the area of a helipad and of a hangar; that can increase the propulsive force of its propellers compared to known air vehicles, thereby enabling a relatively fast flight; and that can reduce the damage incurred in the event of an accident compared to known air vehicles.

Technical Solution

The objects of the present invention are achieved by providing a multipurpose air vehicle, which includes:
a frame on which at least one propeller and a mechanical unit equipped with an engine are mounted, and a cabin is coupled inside the frame,
wherein the frame is provided with two or more arms that can each protrude and retract, and a propeller is provided on the outer end of each arm, and
the cabin includes a connector on each of its front, rear, left, and right ends, and each of these connectors is also installed on a rail of the frame so as to guide how the cabin may pivot.

In addition, the cabin of the air vehicle of the present invention may include a circular plate member, the circular plate member may include a connector on each of its front, rear, left, and right ends, and opposite sides of the frame may include propellers that can be protruded and retracted.

Further, in the air vehicle of the present invention, an additional frame may be provided when a larger accommodation space is needed.

Advantageous Effects of Invention

With the configuration described herein, because two or more propellers are installed so that they can protrude from the frame, the propellers may be formed to have a relatively small size.

In addition, because the propellers are installed on arms that can retract inwards, the area occupied by the air vehicle when moored or in a hangar may be reduced.

In addition, in the present invention, the angle of a propeller may be adjusted to allow the propeller to selectively increase the lift force or the propulsive force it generates. As such, when a sufficient lift force is provided, a propeller may be adjusted so that its operation generates comparatively more propulsive force than lift force, thereby enabling an increase in the forward speed of the air vehicle.

In particular, the circular plate member around the cabin may also generate a lift force. When the circular plate member around the cabin generates a lift force, a propeller may use power to acquire more propulsive force than lift force, thus enabling a further increase in the forward moving speed of the air vehicle.

In addition, in the present invention, the cabin may have sufficient buoyancy in water, and thus may function as a boat. Here, the circular plate member provided around the cabin functions as an underwater wing, thereby allowing the cabin to travel while floating on water, which may ensure high-speed travel with reduced power consumption.

Moreover, in the present invention, in the event of an emergent situation such as a crash, the frame may absorb shocks, which may increase the safety of the occupants inside the cabin.

Figure 1:
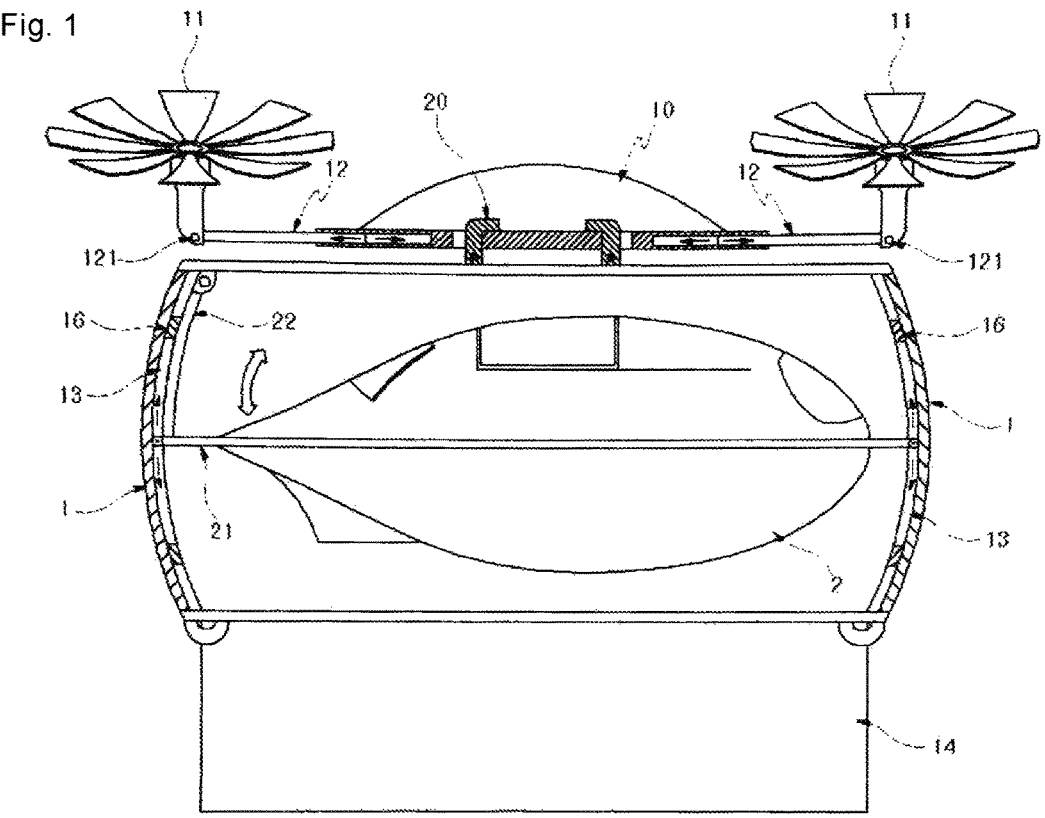
FIG. 1 is a side view illustrating an embodiment of the present invention in which a lower accommodation space is applied.

Hereinafter, a description of reference numerals used in the drawings is as follows:

| Element Number(s) | Element Name |
| --- | --- |
| 1 | frame |
| 101, 102 | circular plate |
| 111, 112, 113, 114 | curved post |
| 10 | mechanical unit |
| 11 | propeller |
| 12 | arm |
| 121 | bendable joint |
| 13 | rail |
| 14 | blade |
| 15 | accommodation space frame |
| 16 | stopper |
| 2 | cabin |
| 21 | connector |
| 22 | winding wire |
| 3 | plate member |

BEST MODE

The present invention provides a multipurpose air vehicle, which may include a frame 1, on which propellers 11 and a mechanical unit 10 equipped with an engine are mounted, and a cabin 2 coupled inside the frame 1. The frame 1 may be constructed by upper and lower circular plates 101 and 102 and curved posts 111, 112, 113 and 114 that interconnect the upper and lower circular plates 101 and 102. Two or more arms 12 may be provided on the frame in a form that allows them to protrude and retract, and at least one propeller 11 may be provided on the tip end of each arm 12.

The cabin 2 may include connectors 21 provided on the front and the rear ends thereof, and the tip end of each connector 21 may be installed to a rail 13 of the frame 1 so as to guide the pivoting of the cabin 21.

In addition, in the present invention, among the arms 12 that are installed on the frame 1 in a form that allows them to protrude and retract and are each provided with at least one propeller 11, at least one arm 12 may have a bendable joint 121 on the tip end thereof and the propeller 11 may be connected to the bendable joint 121 so that the direction of the propeller 11 may be varied up to 90 degrees.

In addition, in the present invention, the frame 1 may be provided on opposite sides thereof with blades 14 that can protrude and retract.

In addition, in the present invention, a circular plate member 3 may be provided around the cabin 2, and the connectors 21 may be installed on the front, the rear, the left, and the right ends of the plate member 3.

In addition, in the present invention, the rail 13 of the frame 1 may be provided with stoppers 15 on the upper and the lower ends thereof so that the connectors 21 of the cabin 2 are controlled by the stoppers 15 so as to prevent excessive pivoting. Winding wires 22 are provided to interconnect the connectors 21 and the frame 1 so as to provide the forward and rearward pivoting force of the cabin 2.

Hereinafter, the present invention will be described in more detail with reference to the accompanying drawings.

The present invention provides a multipurpose air vehicle, which is designed to combine the principles of popular air vehicles such as an airplane, a helicopter, an unmanned vehicle (e.g., a drone), and the like, in order to reduce the anxiety over safety concerns, which is the greatest vulnerability of air vehicles; to minimize the area required for takeoff or landing by achieving a compact form; and to save fuel, reduce air pollution, and prevent problems arising from limited fuel storage by using, as energy sources, both a fossil fuel engine and a high-capacity battery so that the battery can take over operation when the fossil fuel engine is not running.

As illustrated in FIG. 1, the multipurpose air vehicle of the present invention may include the frame 1, on which the propellers 11 and the mechanical unit 10 equipped with an engine are mounted, and the cabin 2 is coupled inside the frame 1. The frame 1 may be equipped with a power device, which is comprised of, for example, an engine that uses a fossil fuel and a motor device that uses a high-capacity battery (a detailed illustration and description of the power device including the engine is omitted).

The frame may be constructed by the upper and the lower circular plates 101 and 102 and four curved posts 111, 112, 113 and 114 that interconnect the upper and the lower circular plates 101 and 102, and may be provided with two or more arms 12 that can protrude and retract. At least one propeller 11 may be provided on the tip end of each arm 12, and four to eight propellers may be installed. Among these propellers, the left and the right propellers may serve to generate a lift force, and the front and the rear propellers may serve to generate a propulsive force.

In the multipurpose air vehicle, the cabin 2 may include the connectors 21 provided on the front and the rear ends thereof, and the tip end of each connector 21 may be installed on the rail 13 of the frame 1 so as to guide the pivoting of the cabin 2.

The cabin 2 may be provided with the circular plate member 3, which encircles the cabin 2 like a ring of Saturn, and the connectors 21 may be provided respectively on the front and the rear ends and the left and right ends of the plate 3. The cabin 2, which is installed on the rail 13 of the frame 1 via the connectors 21, may acquire a large lift force through the provision of the plate member 3. Among the four connectors 21, the left and the right connectors 21 serve as axles when the front and the rear sides of the cabin 2 are moved vertically, and the front and the rear connectors 21 serve as axles when the cabin 2 pivots leftward and rightward.

The mechanical unit 10 and the cabin 2 may be separably coupled to each other. Although a general coupling structure may be selected and implemented as the separable coupling structure of the mechanical unit 10 and the cabin 2, as illustrated in FIG. 1, a plurality of hooks 20, which are installed, using shafts, on the frame 1 to which the cabin 2 is coupled, may be caught by the bottom plate of the mechanical unit 10 so as to hold the same. Such a hook-coupling structure may be easily adapted from the coupling structure of a cable and a lift, at a ski resort.

The mechanical unit 1 includes an engine that uses a fossil fuel and a motor device that uses a high-capacity battery (a detailed illustration and description of both are omitted).

In addition, as illustrated in FIG. 1, in the multipurpose air vehicle, the frame 1 may further include an accommodation space frame 15 thereunder so that the accommodation space frame 15 may be used as a freight compartment for loading freight, or may be used as a passenger cabin for passenger transport, which may diversify the uses of the air vehicle.

Figure 2:
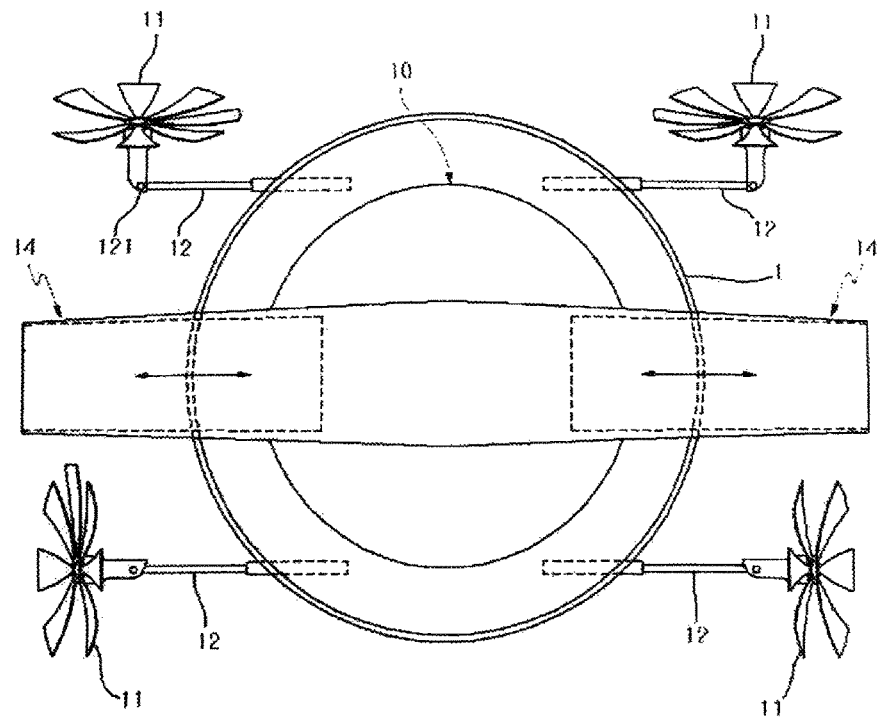
FIG. 2 is a plan view illustrating an embodiment of the present invention in which a propeller blade that can protrude and retract is applied.
Figure 3:
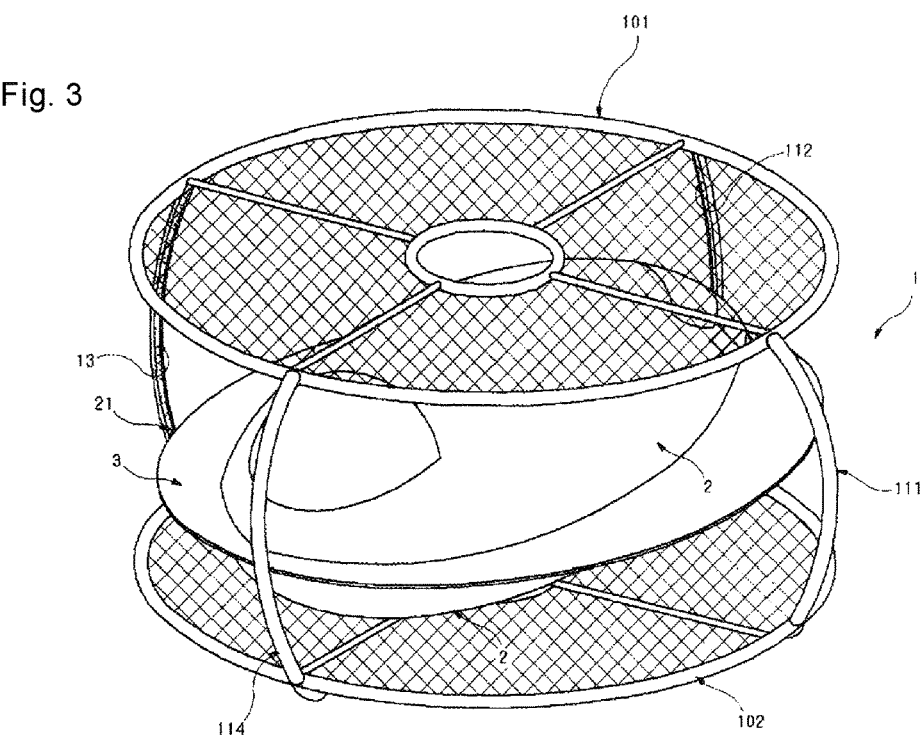
FIG. 3 is a perspective view illustrating only a frame and a cabin with the omission of a mechanical unit.

In addition, as illustrated in FIG. 2, the frame 1 may include blades 14 that can protrude and retract on opposite sides thereof. The blades 14 may provide a lift force like the wings of a general airplane. As such, when the blades 14 provide a lift force while flying, the propeller 11 may serve to provide more of a propulsive force. Therefore, the present invention may promote a remarkable increase in flying speed. In addition, the blades 14 serve to attenuate leftward and rightward shaking while flying.

In addition, in the multipurpose air vehicle of the present invention, when the cabin 2 is installed on the frame 1 using the connectors on the left and the right ends thereof, the front and the rear sides of the cabin 2 may vertically pivot about the connectors, which may ensure that the cabin easily maintains horizontal balance to assist a pilot in easily maintaining a forward view. In addition, because the front side of the bottom of the cabin 2 may be inclined at an angle that is suitable for generating a lift force so that the bottom of the cabin 2 may provide a lift force while flying forward, the supplementation of lift force becomes possible.

In addition, in the multipurpose air vehicle of the present invention, among the arms 12 that are installed to the frame 1 in a form that allows them to protrude and retract, and each arm 12 is provided with at least one propeller 11, at least one arm 12 may have a bendable joint 121 on the tip end thereof and a propeller 11 may be connected to the bendable joint 121.

The bendable joint 121 may allow the direction of a propulsive force, generated by a propeller to be arbitrarily changed, thereby enabling the selection of a direction in which a force acts by, for example, causing the propeller to mainly acquire a lift force, to mainly acquire a propulsive force, or to acquire both a lift force and a propulsive force. In one example, the bendable joint 121 may bend such that the rotational surfaces of all propellers may be horizontally aligned when the air vehicle moves upward, and such that all some of the propellers may be aligned so as to acquire a forward propulsive force when the air vehicle moves forward. The direction in which the propellers are aligned may be arbitrarily determined based on the required lift force and the required propulsive speed, which enables efficient operation.

Figure 4:
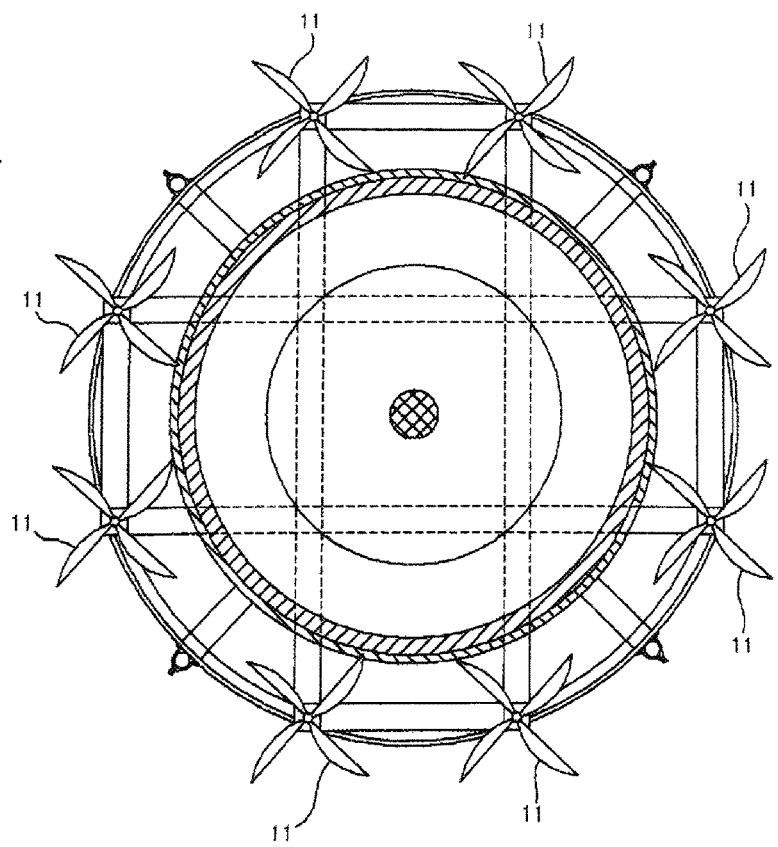
FIG. 4 is a plan view, including a partially cut-away cross-sectional view, illustrating another embodiment of the present invention that has eight propellers, including two pairs provided respectively at the front and the rear sides and two pairs provided respectively at the left and the right sides.
Figure 5:
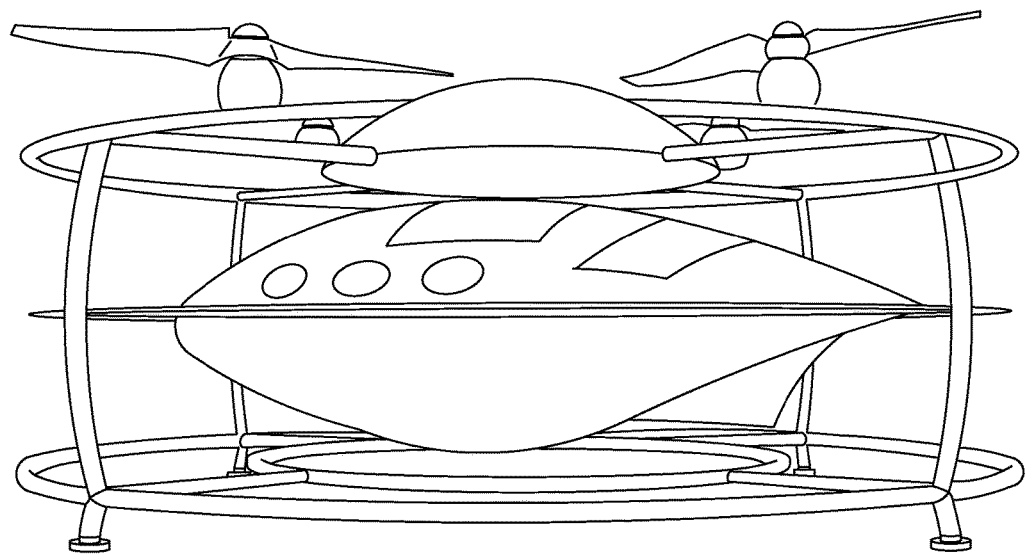
FIGS. 5 through 13 are 3D modeling views and cross-sectional views of embodiments of the present invention.
Figure 6:
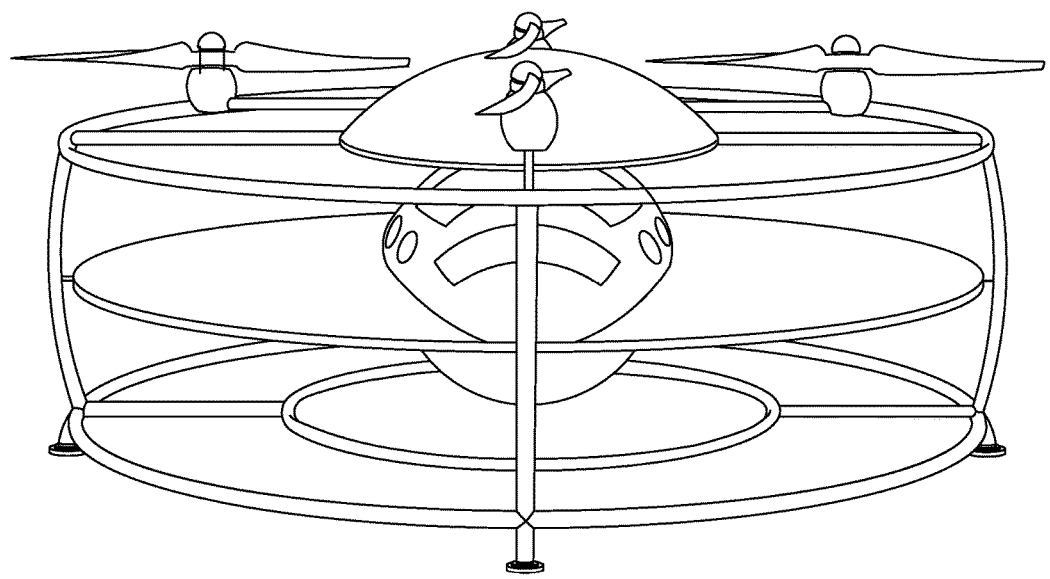
Figure 7:
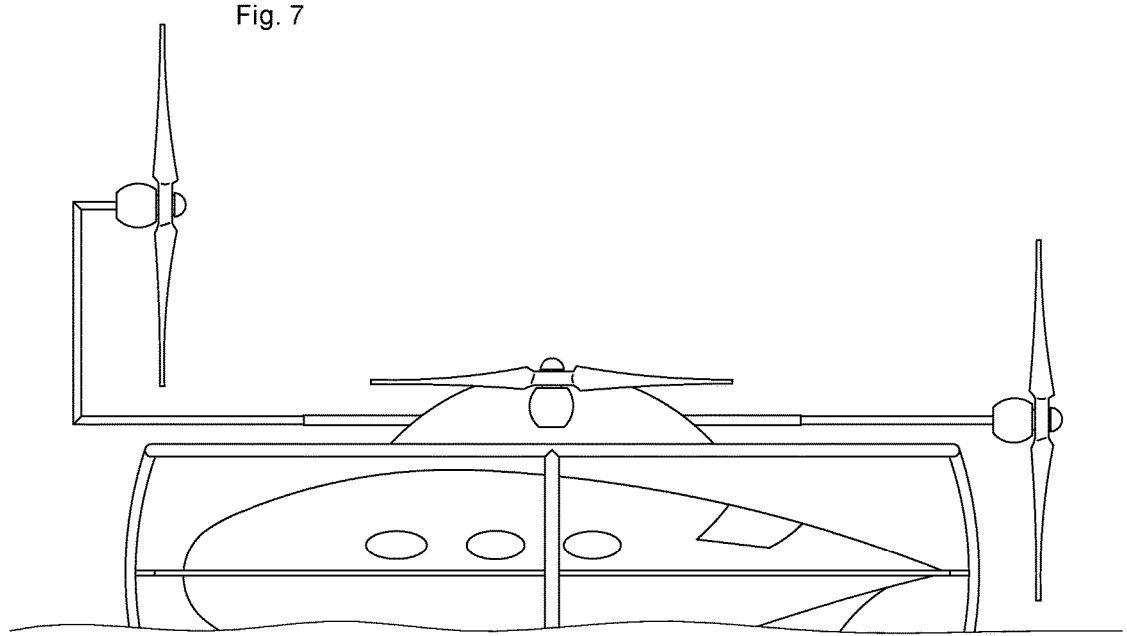
Figure 8:
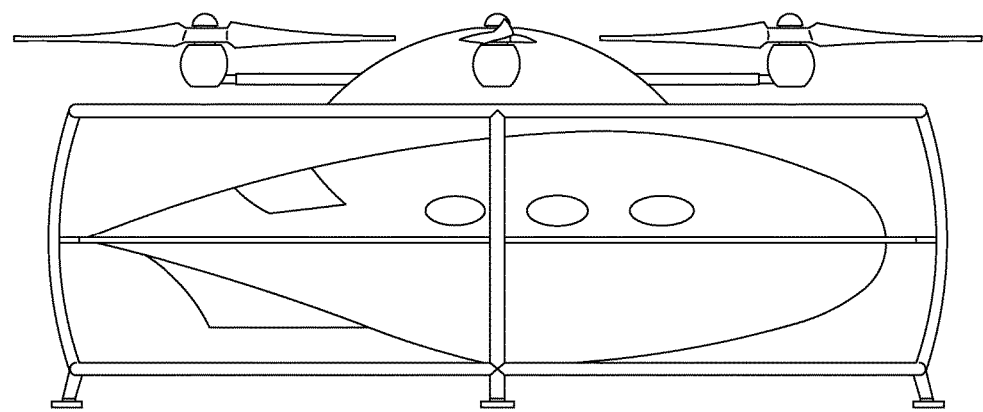
Figure 9:
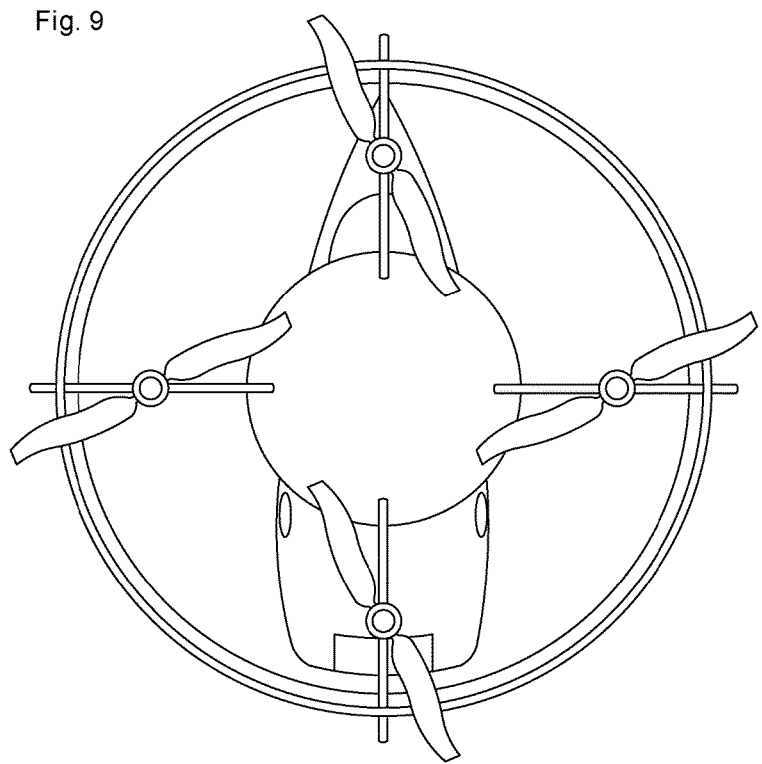
Figure 10:
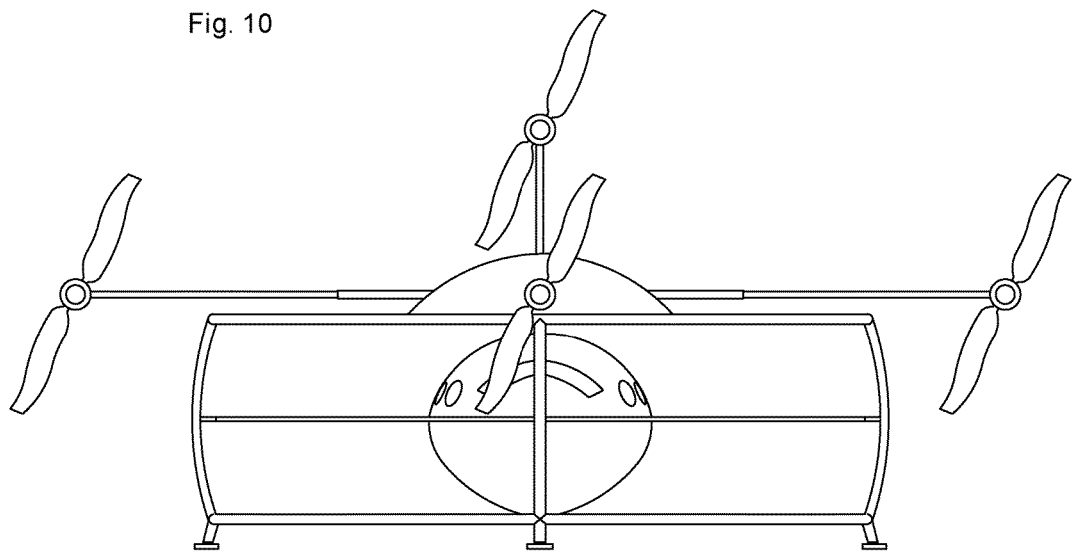
Figure 11:
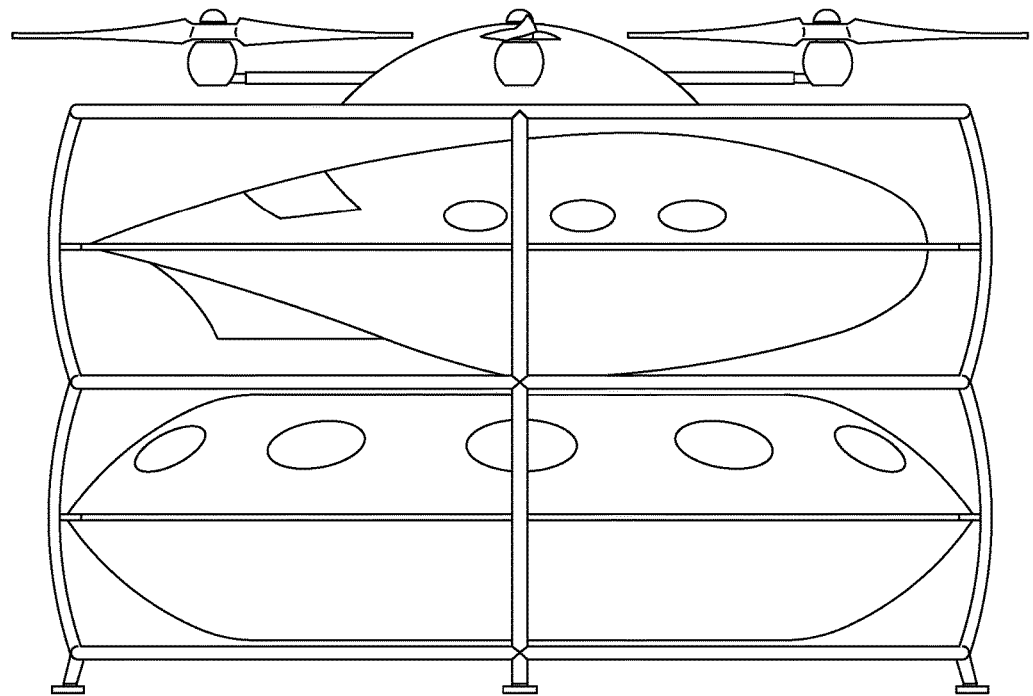
Figure 12:
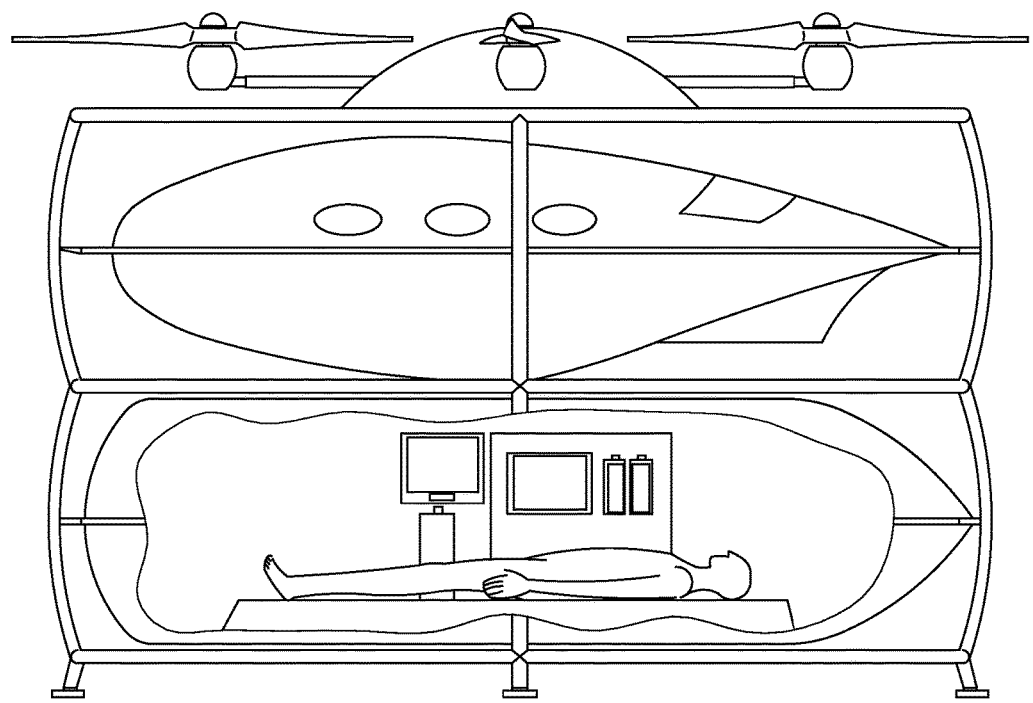
Figure 13:
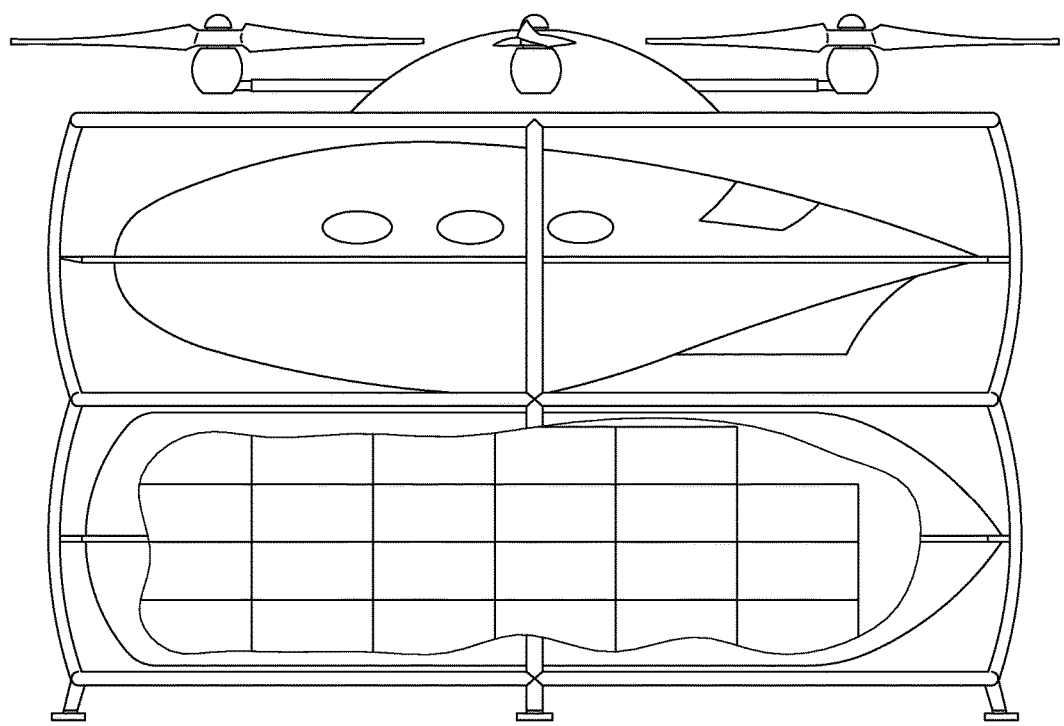

Although four propellers 11 may be provided as illustrated in FIG. 2, eight propellers, including two pairs provided respectively at the front and the rear sides and two pairs provided respectively at the left and the right sides, may be provided as illustrated in FIG. 4.

The rail 13 of the frame 1 may be provided with stoppers 16 on the upper and the lower ends thereof to prevent the connectors 21 of the cabin 2 from excessively pivoting on the rail 13 in order to preclude the connectors 21 from being separated from the rail 13. A pivoting force required for the front the rear sides of the cabin 2 to vertically pivot about the connectors provided on the left and the right sides of the cabin may be acquired by winding or unwinding the winding wires 22, which interconnect the front and the rear connectors 21 and the tipper and the lower ends of the frame 1.

Although the present invention has been described above with reference to the accompanying drawings, the described embodiment is merely one of various embodiments included in the subject matter of the present invention, and is intended to assist those skilled in the art to easily implement the present invention.

It will be apparent to those skilled in the art that the present invention is not limited to the embodiment described above. Thus, the range of the present invention should be interpreted based on the following claims, and all technical ideas, including various modifications, additions, substitutions, etc. made without departing from the subject matter of the present invention, that fall within the range equivalent to the claims should be understood as belonging to the scope of the present invention. In addition, it is noted that some elements in the drawings are provided to more clearly describe the configuration of the present invention and are exaggerated or reduced compared to their actual states. In addition, the reference numerals described in the following claims are merely provided to assist understanding and are not intended to limit the shape or the structure of the present invention to the accompanying drawings.

The invention claimed is:

1. A multipurpose air vehicle comprising:
   a frame (1) on which a plurality of propellers (11) and a mechanical unit (10) equipped with an engine are mounted; and
   a cabin (2) coupled inside the frame (1), having a front end, opposing rear end, a left end and an opposing right end
   wherein the frame (1) is constructed by upper and lower circular plates (101, 102) and curved posts (111, 112, 113, 114) that interconnect the upper and the lower circular plates (101, 102),
   wherein the frame (1) is provided with two or more arms (12) that can protrude and retract, and at least one of the plurality of propellers (11) is provided on the tip end of each arm (12), and
   wherein the cabin (2) includes connectors (21) provided on the front, the rear ends, the left, and the right ends of the cabin (2), and each connector (21) has a tip end installed on a rail (13) of the frame (1) so as to guide pivoting of the cabin (21).

2. The multipurpose air vehicle according to claim 1, wherein, among, the arms (12) that are installed, on the frame (1) in a form that allows them to protrude and to retract and are each provided with at least one of a plurality of propellers (11), at least one arm (12) has a bendable joint (121) on the tip end thereof so that the propeller (11) is connected to the bendable joint (121).

3. The multipurpose air vehicle according to claim 1, wherein the frame (1) includes blades (14) provided on opposite sides thereof in a form that allows them to protrude and to retract.

4. The multipurpose air vehicle according to claim 1, wherein the cabin (2) is provided with a circular plate member (3), and the connectors (21) are installed on the front, the rear, the left, and the right ends of the plate member (3).

5. The multipurpose air vehicle according to claim 1, wherein the rail (13) of the frame (1) is provided with stoppers (15) on the upper and the lower ends thereof so that the connectors (21) of the cabin (2) are controlled by the stoppers (15) so as to prevent excessive pivoting, and
   wherein each connector (21) and the frame (1) are connected to each other by a winding wire (22) configured to, provide a forward and a rearward pivoting force of the cabin (2).

6. The multipurpose air vehicle according to claim 2, Therein the rail (13) of the frame (1) is provided with stoppers (15) on the upper and the lower ends thereof so that the connectors (21) of the cabin (2) are controlled by the stoppers (15) so as to prevent excessive pivoting, and wherein each connector (21) and the frame (1) are connected to each other by a winding wire (22) configured to provide a forward and a rearward pivoting force of the cabin (2).

7. The multipurpose air vehicle according to claim 3, wherein the rail (13) of the frame (1) is provided with stoppers (15) on the upper and the lower ends thereof so that the connectors (21) of the cabin (2) are controlled by the stoppers (15) so as to prevent excessive pivoting, and wherein each connector (21) and the frame (1) are connected to each other by a winding wire (22) configured to provide a forward and a rearward pivoting force of the cabin (2).

8. The multipurpose air vehicle according to claim 4, wherein the rail (13) of the frame (1) is provided with stoppers (15) on the upper and the lower ends thereof so that the connectors (21) of the cabin (2) are controlled by the stoppers (15) so as to prevent excessive pivoting, and wherein each connector (21) and the frame (1) are connected to each other by a winding wire (22) configured to provide a forward and a rearward pivoting force of the cabin (2).

\* \* \* \* \*